UNITED STATES PATENT OFFICE.

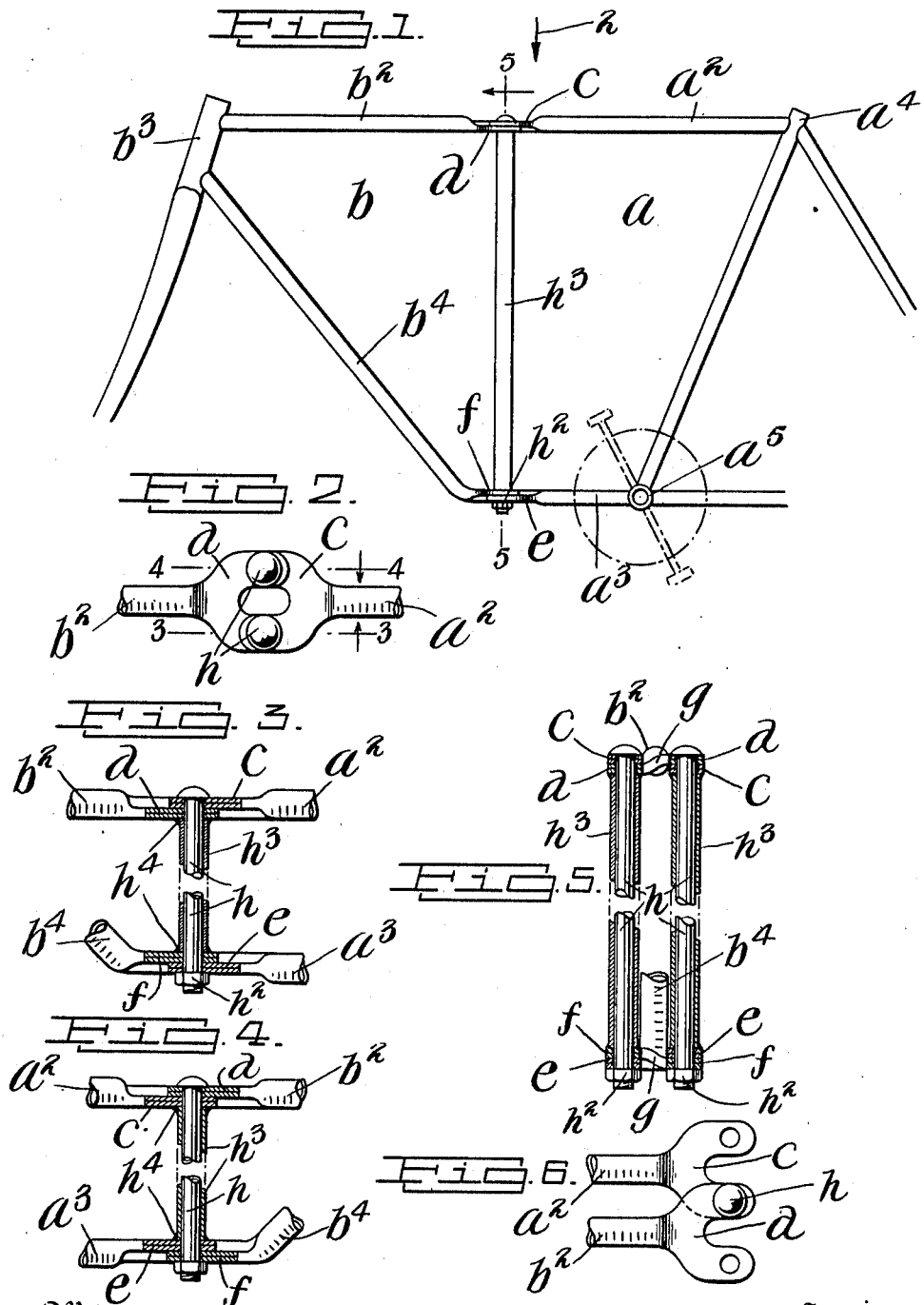

DAVID GROSSMAN, OF NEW YORK, N. Y.

FOLDING BICYCLE.

1,096,504.

Specification of Letters Patent.

Patented May 12, 1914.

Application filed June 17, 1913. Serial No. 774,240.

*To all whom it may concern:*

Be it known that I, DAVID GROSSMAN, a citizen of Hungary, and residing at New York, in the county of New York and State of New York, have invented certain new and useful Improvements in Folding Bicycles, of which the following is a specification, such as will enable those skilled in the art to which it appertains to make and use the same.

This invention relates to bicycles and particularly to the frame of vehicles of this class, and the object thereof is to provide a frame for vehicles of this class composed of front and back parts connected centrally and vertically, or approximately centrally and vertically, by a hinge or pivotal construction whereby the front part, when the vehicle is not in use, may be folded back and lie upon or in contact with, or adjacent to the back part, or the back part folded on or adjacent to the front part so that the vehicle will occupy but small space and can be easily packed or shipped and carried about from place to place.

The invention is fully disclosed in the following specification, of which the accompanying drawing forms a part, in which the separate parts of my improvement are designated by suitable reference characters in each of the views, and in which;—

Figure 1 is a side view of the frame of a bicycle made according to my invention; Fig. 2 a plan view of the central part thereof looking in the direction of the arrow 2 of Fig. 1; Fig. 3 a sectional view on the line 3—3 of Fig. 2; Fig. 4 a similar view on the line 4—4 of Fig. 2; Fig. 5 a section on the line 5—5 of Fig. 1, and Fig. 6 a view similar to Fig. 2 but showing the back part of the frame folded forwardly.

In the practice of my invention, as shown in the drawing, I provide a bicycle frame comprising a back part $a$ and front part $b$, said parts being preferably of the usual form and construction except for the modification shown, and hereinafter described.

The back part $a$ of the frame comprises a top horizontal member $a^2$ and a bottom horizontal member $a^3$, the top horizontal member $a^2$ extending forwardly of the seat support $a^4$ a predetermined distance, and the bottom horizontal member $a^3$ extending forwardly of the pedal crank support $a^5$ a corresponding distance. The front part $b$ of the frame comprises the usual horizontal top member $b^2$, the front wheel fork head $b^3$ and a downwardly and backwardly directed member $b^4$, all of said parts or members of the frame being composed of tubes in the usual manner. The front end of the part $a^2$ of the frame is provided with a fork or yoke $c$, and the rear end of the part $b^2$ is provided with a corresponding fork or yoke $d$, and the front end of the part $a^3$ of the frame is provided with a fork or yoke $e$, while lower and rear end of the part $b^4$ is provided with a small fork or yoke $f$.

In connecting the front and back parts of the frame, the forks or yokes $c$ and $d$ of the parts $a^2$ and $b^2$, are overlapped, as shown, and the forks or yokes $e$ and $f$ of the parts $a^3$ and $b^4$ are also overlapped, as shown, and in this operation the said forks or yokes are preferably twisted laterally, as shown at $g$, so that one side of one fork or yoke lies on top of the corresponding side of the other fork or yoke, and the other side of the first named fork or yoke under the corresponding side of the second named fork or yoke. When the forks or yokes $c$ and $d$, and $e$ and $f$, of the parts $a^2$ and $b^2$, and $a^3$ and $b^4$ have been connected in the manner described, coupling rods or bolts $h$ are passed downwardly therethrough, as clearly shown in Figs. 3, 4 and 5 and provided at their lower ends with nuts $h^2$, and sleeves $h^3$ are placed on the rods or bolts $h$ and fit snugly between the forks or yokes $c$ and $d$ and the forks or yokes $e$ and $f$, and these sleeves $h^3$ are welded or otherwise rigidly secured to the corresponding sides of said forks or yokes, as indicated at $h^4$.

With this construction, a strong substantial frame is produced, and by taking out one of the rods or bolts $h$, at any time, either the front part $b$ of the frame may be folded backwardly, or the back part $a$ may be folded forwardly, as indicated in Fig. 6, and said parts of the frame may thus be folded compactly together for packing, shipping, or other purposes so as to take up but small space.

My invention is not limited to the exact method of, and means for connecting the front and back parts of the frame, as herein shown and described, and various changes in and modifications of said construction may be made, within the scope of the appended claims, without departing from the spirit of my invention, or sacrificing its advantages.

Having fully described my invention what I claim as new and desire to secure by Letters Patent is:—

1. A bicycle frame composed of front and back parts having parallel top and bottom members connected approximately centrally, said members being provided with horizontal top and bottom yoke-shaped overlapping portions and parallel and transversely arranged rods passed vertically through said yoke-shaped portions, and one of which is adapted to be removed so as to provide a hinge of which the other forms a part and on which the front and back parts of the frame can be folded.

2. A bicycle frame composed of front and back parts having parallel top and bottom members connected approximately centrally, said members being provided with horizontal top and bottom yoke-shaped overlapping portions and parallel and transversely arranged rods passed vertically through said yoke-shaped portions, and one of which is adapted to be removed so as to provide a hinge of which the other forms a part and on which the front and back parts of the frame can be folded, and sleeves mounted on said rods and secured to the corresponding yoke-shaped members.

In testimony that I claim the foregoing as my invention I have signed my name in presence of the subscribing witnesses this 16th day of June, 1913.

DAVID GROSSMAN.

Witnesses:
C. MULREANY,
S. ANDREWS.

---

Copies of this patent may be obtained for five cents each, by addressing the "Commissioner of Patents, Washington, D. C."